(12) United States Patent
Miyazaki et al.

(10) Patent No.: US 10,571,722 B2
(45) Date of Patent: Feb. 25, 2020

(54) OPTICAL MODULATOR AND OPTICAL TRANSMISSION APPARATUS HAVING SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 68 days.

(21) Appl. No.: 16/016,661

(22) Filed: Jun. 25, 2018

(65) Prior Publication Data

US 2018/0373066 A1    Dec. 27, 2018

(30) Foreign Application Priority Data

Jun. 27, 2017    (JP) .................................. 2017-125540

(51) Int. Cl.
*G02F 1/01*    (2006.01)

(52) U.S. Cl.
CPC ........ *G02F 1/0121* (2013.01); *G02F 2203/50* (2013.01)

(58) Field of Classification Search
CPC .... G02F 1/0121; G02F 2203/50; G02F 1/011; G02F 1/0102

See application file for complete search history.

(56) References Cited

U.S. PATENT DOCUMENTS

2018/0217467 A1*    8/2018    Miyazaki ................ G02F 1/225

FOREIGN PATENT DOCUMENTS

| JP | 2003338520 | 11/2003 |
|---|---|---|
| JP | 2014195061 | 10/2014 |

\* cited by examiner

*Primary Examiner* — Joseph P Martinez
(74) *Attorney, Agent, or Firm* — JCIPRNET

(57) ABSTRACT

An optical modulation element configured by forming an optical waveguide on an optical element substrate and a polarization-combining part that combines light waves modulated in the optical modulation element are disposed in a housing. A plurality of lead pins are fixed to a side wall of the housing. Each of the plurality of lead pins has a protrusion portion protruding into an internal space of the housing and is electrically connected to the optical modulation element by bonding a wire to the protrusion portion. A loop shape of a wire that is bonded and connected to at least part of the lead pins among the plurality of lead pins is different from a loop shape of a wire that is bonded and connected to other lead pins.

12 Claims, 15 Drawing Sheets

OPTICAL MODULATOR AND OPTICAL TRANSMISSION APPARATUS HAVING SAME

CROSS-REFERENCE TO RELATED APPLICATIONS

This application claims the benefit of Japanese Patent Application No. 2017-125540 filed Jun. 27, 2017, the disclosure of which is herein incorporated by reference in its entirety.

BACKGROUND OF THE INVENTION

Field of the Invention

The present invention relates to an optical modulator and in particular, to an optical modulator having a large number of lead pins, such as a dual polarization-quadrature phase shift keying (DP-QPSK) modulator.

Description of Related Art

In an optical communication field, an optical transmission apparatus equipped with a high-frequency optical modulator is used. In recent years, demands for larger capacity and a reduction in the size of the optical transmission apparatus have been increased. With respect to the larger capacity of the optical transmission apparatus, an optical modulator with higher transmission capacity has been realized by changing a modulation form from conventional intensity modulation (On-Off Keying) or the like to a transmission format incorporating multi-level modulation and further polarization multiplexing, such as QPSK or DP-QPSK using phase modulation.

For example, in the case of a DP-QPSK modulator, transmission of small size and large capacity is realized by integrating four RF input parts for inputting a high-frequency signal (RF signal) and four optical modulator units that perform modulation in response to these high-frequency signals on one optical element substrate. For the optical element substrate, in addition to a material such as LiNbO$_3$ or InP, a material using Si, or the like is recently appearing. A DP-QPSK modulator of the related art shown in FIG. 1 has a structure in which an optical modulation element 12 configured by forming an optical waveguide 13 on an optical element substrate, and a polarization-combining part 14 which combines light waves modulated in the optical modulation element 12 are mounted in a housing 11. The light wave combined in the polarization-combining part 14 is sent out from an optical transmission apparatus as an optical output through an output optical fiber connected to the housing 11.

In the case of the DP-QPSK modulator, four sub-Mach-Zehnder optical waveguides each configuring an optical modulator unit are formed on the optical element substrate, and a high-frequency signal electrode (not shown) for applying a high-frequency signal to each of the optical modulator units is also formed on the optical element substrate. Further, a DC bias electrode (not shown) for applying a DC bias signal to each of the optical modulator units is formed, and a light-receiving element (a monitor PD) for monitoring light intensity for feedback control is disposed. Further, in addition to the RF input part for inputting a high-frequency signal, a large number of lead pins such as a DC bias input pin for inputting a DC bias signal and a PD signal output pin for outputting a detection signal from the light-receiving element are required, and a structure is made in which each lead pin is led out from the side surface of the housing. In many case, the interval between the lead pins is determined according to a standard, and usually, the led pins are arranged at regular intervals. However, it is very difficult to design electrode pads on the optical modulation element side at the same positions and at the same intervals as the intervals of the lead pins due to various design factors or constraints.

Therefore, as shown in FIG. 1, it is usual to provide a relay substrate 15 for relaying between the optical modulation element 12 and a lead pin 16. On the relay substrate 15, an electrode pad P2 which is wire-bonded to an electrode pad P1 of the optical modulating element 12 is disposed so as to face and be in close proximity to the electrode pad P1 of the optical modulation element 12. Further, an electrode pad P3 which is wire-bonded to the lead pin 16 is disposed so as to face and be in close proximity to the lead pin 16. This is for allowing wire bonding to be performed as short as possible and in the same shape as much as possible, within a range in which reliability is guaranteed.

The DP-QPSK modulator shown in FIG. 1 has a total of 18 pins including a ground pin and an NC (Not Connect) pin, in addition to the DC bias input pin and the PD signal output pin, as the lead pins 16. It does not mean that the required number of lead pins in the DP-QPSK modulator is 18, and the number of lead pins is changed according to the presence or absence of the DC bias electrode, the presence or absence of the ground pin, or the like. In the usual case, the number, disposition, and the like of the pins are standardized through an industry group that manufactures or uses optical modulators.

As such a configuration having a large number of lead pins, a multiple-pin configuration such as a butterfly pin of a semiconductor LD (semiconductor laser) housing is widely used. These pins are hermetically sealed by embedding a ceramic substrate on which electric wiring and a bonding pad are patterned in a hole formed in a housing and fixing the ceramic substrate with a brazing material or the like. Further, a lead pin for substrate connection is fixed to the outside with a brazing material or solder, and in the interior, an optical element is electrically connected to a wiring pattern on the ceramic substrate by wire bonding.

Such a butterfly pin configuration has an advantage that it can be formed into multiple pins with a compact size, high precision, and high density. However, due to a difference in coefficient of thermal expansion between a metallic housing and a ceramic material, there is a disadvantage that an increase in size is not possible due to a reliability problem (ceramic substrate cracking or hermetic seal leakage occurs due to a temperature change), and a manufacturing cost increases, and the like. For this reason, the butterfly pin is not used for a relatively large-sized DP-QPSK modulator or the like using LiNbO$_3$ or the like as a material. In the DP-QPSK modulator or the like, as a substitute for the butterfly pin, a lead pin configuration is used in which hermetic sealing of fixing a lead pin inserted into a hole penetrating a side wall of a housing with a glass sealing material can be performed at a relatively low cost.

An electrical signal having a frequency component in a range from DC to MHz can be applied to a lead pin which is used in an optical modulator. However, an electrical signal having a lower frequency than that of a high-frequency RF connector is applied to the lead pin. For this reason, a configuration is adopted in which the degree of freedom of design is high and it can be easily realized by passing a lead pin through a housing and fixing the lead pin. That is, unlike the butterfly pin configuration of the semiconductor LD housing, or the like, a configuration is adopted in which a lead pin is provided such that the pin itself is in a cantilevered hollow state in the interior of a housing and wire bonding for electrical connection is directly performed on the lead pin. Here, the lead pin in the cantilevered hollow state is a lead pin in which a part of the lead pin is fixed to a side wall of the housing and a tip (a portion to be wire-bonded) of a portion protruding into an internal space of the housing becomes a free end. For example, Japanese Laid-open Patent Publication No. 2014-195061 discloses an electronic device having a structure in which a lead pin is made to be in a cantilevered hollow state in the interior of a housing.

In wire bonding connection, in order to enhance connection strength and further enhance the stability and reproducibility of the connection under a short connection time, in general, ultrasonic vibration is applied while applying thermal compression bonding. These functions are introduced in many wire bonding apparatuses. For example, Japanese Laid-open Patent Publication No. 2003-338520 discloses a wire bonding apparatus in which an excitation frequency of a capillary is set to a frequency different from the natural frequency of a wire.

SUMMARY OF THE INVENTION

The connection strength of wire bonding (in many cases, a gold wire) is needed to be strength having sufficient connection reliability with respect to external failure causes which can occur at the time of assembly, transportation, installation, and operation of an optical modulator or an optical transmission apparatus equipped with the optical modulator. Therefore, a jig or the like for providing a bonding connection condition of the same material and the same design as a lead pin to be connected by bonding is fabricated in advance, and the conditions (a heating temperature, applied power, an applied time, applied weight, and the like) of wire bonding are determined. Further, in general, for improvement in the connection strength of wire bonding, improvement in the stabilization and reproducibility of the connection strength, and the like, application of ultrasonic vibration is performed in addition to thermal compression bonding of a wire. The frequency of the ultrasonic wave which is applied is different according to a type of an apparatus or a manufacturer of the apparatus. However, the frequency is in a range of about 30 kHz to 200 kHz.

The condition of the wire bonding is set such that the connection strength of the bonded wire is a value having a sufficient margin with respect to critical connection strength ($g_{min}$), which is the minimum required, taking into consideration the distribution of connection strength. For example, in a case where the critical connection strength $g_{min}$ which is required for an optical modulator is set to be 2 g, the condition is set such that average connection strength $g_0$ is 6 g that is 3 times 2 g and a design safety margin taking into account a connection strength distribution is 4 g that is 2 times 2 g. These conditions are appropriately changed according to various factors such as the diameter of a gold wire, the material of an object to be bonded, the surface state of the object to be bonded, an environment (in a communication base station, outdoors, in aircraft, in a rocket, in a satellite) to which an optical modulator is adapted, and an adaptive reliability standard.

After the condition with a sufficient margin is determined, if the material and shape of a lead pin to be bonded, a housing fixing configuration, used equipment, and the like are the same, even if wire bonding is performed under the same condition in housings having different designs, connection having sufficient connection reliability is possible. However, it is premised that a wire bonding apparatus is maintained and routinely inspected and a factor such as apparatus failure is eliminated.

In such circumstances, also in the existing DP-QPSK modulator, there are strong demands for a further reduction in size and an increase in capacity. For this reason, a study of further reducing the size of a housing by performing various devisal such as a change of an RF input part from a conventional push-on type connector to a flexible printed circuit (FPC) or the like, a reduction in the size of a polarization-combining part, and a reduction in the size of an optical modulation element itself is progressing.

However, in such a small-sized DP-QPSK modulator or the like, it is found that there is a case where bonding which falls below the critical connection strength occurs when using the wire bonding of the related art, in which sufficient connection reliability has been obtained and many mass-production results have been accumulated. There is a case where such poor bonding occurs in spite of the fact that the material and shape of the lead pin to be bonded, the housing fixing configuration, the used equipment, and the like are the same and wire bonding is performed under the same bonding condition.

If there is bonding which falls below the critical connection strength, there is a possibility that an event in which a wire peels off from a lead pin (wire peeling) may occur. Further, there is also a possibility that an event in which a wire of a bonding portion is broken (neck breaking) may occur. If a problem such as the wire peeling or the neck breaking occurs during the operation of an optical communication system, it causes a big influence such as a serious breakdown leading to catastrophic failure where the operation is stopped at a stroke. Further, from now, an attempt is also being made to increase transmission capacity by integrating a plurality of DP-QPSK modulation elements in one housing. According to this, the number of lead pins which are provided in an optical modulator further increases, and therefore, securing connection reliability becomes a more important issue.

It is found that the bonding which falls below the critical connection strength is not caused by a breakdown of a wire bonding apparatus, abnormality of a connection surface state or the like of a lead pin itself to be bonded, or the like. Further, it is also found that in the connection to a single lead pin, the connection strength as in the related art is obtained.

Here, vibration which is generated when wire bonding is performed on the lead pin propagates to the other lead pin through the side wall of the housing to which the lead pin is fixed, and vibrate the other lead pin. In a case where the lead pin of the vibration propagation destination obtains the propagated vibration energy and vibrates in a resonant manner, the range of oscillation of the lead pin can be maximized. In a case where wire bonding has been already performed on the lead pin of the vibration propagation destination, the bonding portion can violently vibrate due to the resonance of the lead pin. Normally, in order to maintain sufficient connection strength even if some vibration or impact is applied, bonding is performed under the condition that the connection strength having a sufficient design margin with respect to the critical connection strength is obtained. For this reason, even if the vibration as described above is applied to the lead pin, it is unlikely that connection reliability will be impaired immediately.

However, in a case where vibration is intermittently applied from many other lead pins, and in a case where vibration energy propagates without being attenuated so much, the original connection strength may be lowered. In recent years, due to the trend of a reduction in the size of the housing, a pin interval becomes closer or a pin forming unit interval becomes closer, and thus the vibration energy easily propagates to other lead pins without being attenuated so much. For this reason, although part of the bonded lead pins originally have sufficient connection strength with respect to the critical connection strength, the connection strength thereof may fall below the critical connection strength due to wire bonding to other lead pins.

This is thought to be a mechanism by which bonding falling below the critical connection strength occurs in spite of the fact that the material or shape of the lead pin to be wire-bonded, the housing fixing configuration, the used equipment, and the like are the same and wire bonding is performed under the same bonding condition. That is, even in the wire bonding performed with various requirements described above being the same, if the housing is downsized and the pin interval or the pin forming unit interval is changed, the connection strength of the existing bonding can be changed due to the propagation of vibration.

Here, the natural frequency f (Hz) relating to longitudinal vibration of the lead pin can be calculated from the following Expression 1. $\lambda$ is a constant which is determined by a boundary condition and a vibration mode, L is the length of the lead pin, E is the longitudinal elastic modulus (Young's modulus) of the material of the lead pin, and $\rho$ is the mass per unit volume of the material of the lead pin.

$$f = \lambda/2\pi L \cdot \sqrt{(E/\rho)} \quad \text{(Expression 1)}$$

For example, in a case where a lead pin using Fe (E=200× $10^9$ N/m², $\rho$=7.83×$10^6$ kg/m³) as a material and having a square (width: 0.35 mm) cross-sectional shape and a length of 0.8×$10^{-3}$ mm is used, longitudinal vibration of 50 kHz, 150 kHz, 250 kHz, or the like occurs. Further, in a case where a lead pin having a length of 1.7×$10^{-3}$ mm is used under the same condition, longitudinal vibration of 23.5 kHz, 70.6 kHz, 117.6 kHz, or the like occurs. A vibration frequency which is applied by a wire bonding apparatus is in a range of 30 kHz to 200 kHz and the natural frequency of the lead pin is included therein. For this reason, the resonance of the lead pin is induced by the application of ultrasonic waves by the wire bonding apparatus, and thus it is found that there is a possibility that poor bonding in which the connection strength falls below the critical connection strength may occur.

An object of the present invention is to suppress, in an optical modulator having a large number of lead pins fixed so as to protrude from a side wall of a housing into an internal space, a decrease in the connection strength of wires bonded and connected to the lead pins.

In order to achieve the above object, an optical modulator according to the present invention has the following technical features.

(1) An optical modulator, including: an optical modulation element; a housing, in which the optical modulation element is accommodated; and a plurality of lead pins, being fixed to a side wall of the housing, in which each of the plurality of lead pins has a protrusion portion protruding into an internal space of the housing, and each of the plurality of lead pins is electrically connected to the optical modulation element or a relay substrate electrically connected to the optical modulation element, by wire bonding to the protrusion portion, and a loop shape of a wire which is bonded and connected to at least part of the lead pins among the plurality of lead pins is different from a loop shape of a wire which is bonded and connected to other lead pins in at least one of a direction of a loop of the wire with respect to a length direction of the lead pin, a length of the loop of the wire, or a height of the loop of the wire.

(2) In the optical modulator according to the above (1), the plurality of lead pins including: a lead pin bonded and connected to an electrode pad of the optical modulation element, and a lead pin bonded and connected to an electrode pad of the relay substrate.

(3) In the optical modulator according to the above (1) or (2), electrode pads which are bonded and connected to the optical modulation element or the relay substrate are disposed, such that a distance between the electrode pad and the lead pin with respect to an arrangement direction of the lead pin is different between at least part of the lead pins and the other lead pins.

(4) In the optical modulator according to any one of the above (1) to (3), electrode pads which are bonded and connected to the optical modulation element or the relay substrate are disposed at different height positions with respect to a height direction from a bottom surface of the housing between at least part of the lead pins and the other lead pins.

(5) In the optical modulator according to any one of the above (1) to (4), a height of the lead pin from a bottom surface of the housing is a height different between at least part of the lead pins and the other lead pins.

(6) In the optical modulator according to any one of the above (1) to (5), at least part of the lead pins among the plurality of lead pins are fixed to the side wall of the housing with bonding surface directions different from those of the other lead pins.

(7) An optical transmission apparatus including the optical modulator according to any one of the above (1) to (6).

According to the present invention, resonance of the other lead pin due to vibration which occurs during wire bonding is reduced, and therefore, it is possible to suppress a decrease in the connection strength of a wire bonded and connected to the lead pin.

DETAILED DESCRIPTION OF THE INVENTION

An optical modulator according to the present invention and an optical transmission apparatus equipped with the optical modulator will be described. The present invention is not limited by examples shown in the following embodiments.

Figure 1:
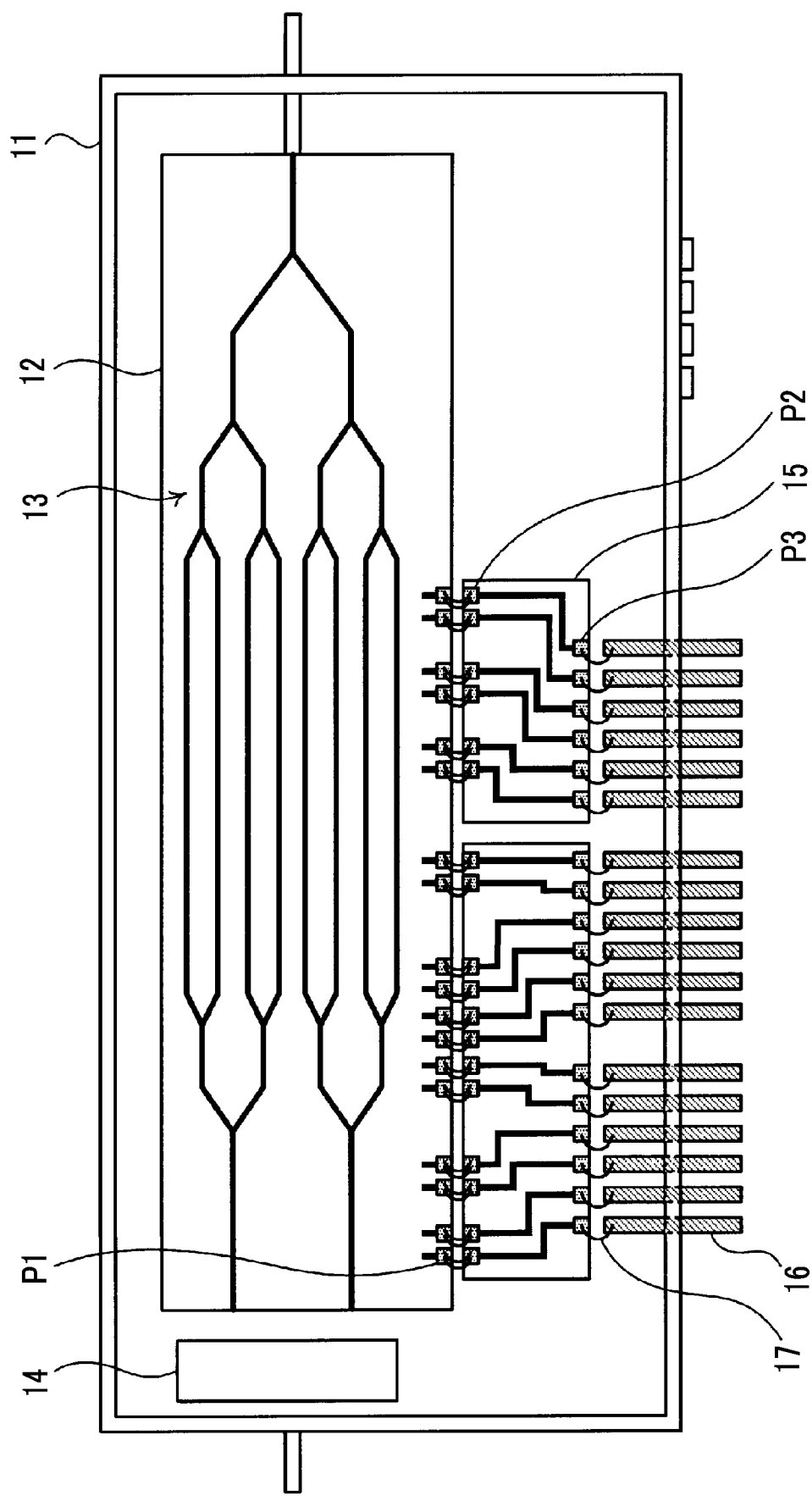
FIG. 1 is a diagram showing a configuration example of a DP-QPSK modulator of the related art.

In the optical modulator according to the present invention, as a basic configuration, similarly to the example of the related art shown in FIG. 1, an optical modulation element 12 configured by forming an optical waveguide 13 on an optical element substrate and a polarization-combining part 14 that combines light waves modulated in the optical modulation element 12 are disposed in a housing 11. Further, a high-frequency signal electrode and a DC bias electrode are formed, and a light-receiving element (a monitor PD) for monitoring light intensity for feedback control, and the like are also disposed. A plurality of lead pins 16 are fixed to a side wall of the housing 11. Each of the plurality of lead pins 16 has a protrusion portion which protrudes into an internal space of the housing 11, and is electrically connected to the optical modulation element 12 by bonding a wire 17 to the protrusion portion.

In a general configuration, the optical modulation element 12 and the lead pin 16 are indirectly connected to each other through a relay substrate 15 disposed therebetween.

As the lead pin 16, in addition to a DC bias input pin for inputting a DC bias signal in order to apply a DC bias to the optical modulation element 12, and a PD signal output pin for outputting a detection signal by the light-receiving element for feedback control, a ground pin, an NC pin, and the like are also included.

Figure 5:
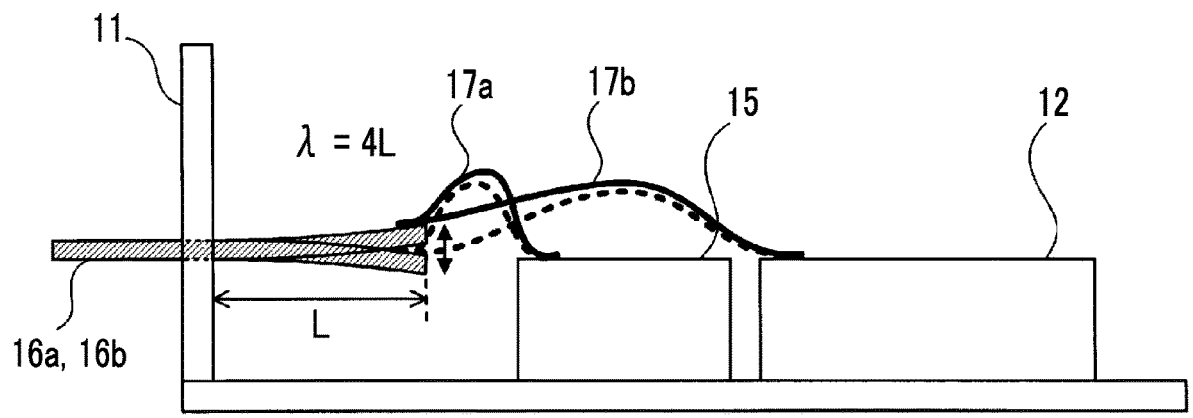
FIG. 5 is a diagram showing a state in which the lengths of loops of wires in wire bonding are made to be different from each other.
Figure 6:
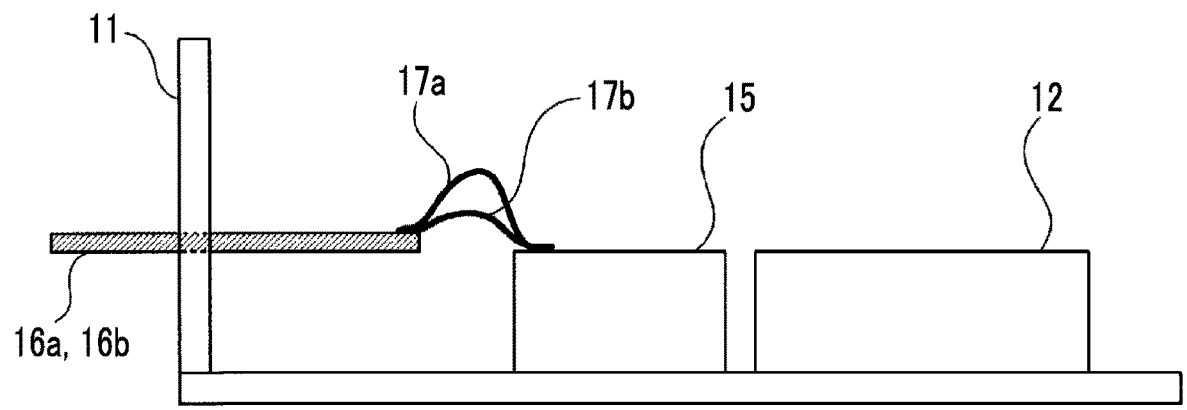
FIG. 6 is a diagram showing a state in which the heights of loops of wires in wire bonding are made to be different from each other.

A main feature of the optical modulator according to the present invention is that a loop shape of a wire 17a which is bonded and connected to each of at least part of the lead pins 16a among the plurality of lead pins 16 is different from a loop shape of a wire 17b which is bonded and connected to each of other lead pins 16b, as in examples shown in FIGS. 5 and 6 and the like.

As a vibration mode of the lead pin, there may be several modes such as longitudinal vibration, lateral vibration, and torsional vibration. However, if vibration energy at the time of wire bonding concentrates on a specific vibration mode, resonance with strong energy occurs. As a result, a vibration wave which propagates through the side surface of the housing to which the lead pin is fixed and reaches the other lead pin also becomes strong, and the degree of influence on the other lead pins also increases. As a result, a decrease in the connection strength of the wire bonded and connected to the lead pin can occur.

Therefore, in the present invention, wire bonding in which a loop shape of the wire is different from that in the other lead pin is performed. As described above, as the vibration mode of the lead pin, there are several modes such as longitudinal vibration, lateral vibration, and torsional vibration, and each vibration mode changes according to a condition or a situation at the time of bonding. Therefore, under the condition that the loop shapes of the wires are different from each other, it becomes difficult for vibration energy to concentrate on a specific vibration mode, compared to the condition that the loop shapes of the wires are the same. In this way, resonance of the other lead pin due to vibration occurring during wire bonding is reduced, and therefore, a decrease in the connection strength of the wire bonded and connected to the lead pin can be suppressed. Further, if wire bonding is performed such that the loop shapes are different from each other, even if the vibrations of the lead pins are the same, the influence of the vibration on a neck or a connection portion of the loop can become different due to a difference in loop shape. For this reason, even if specific strong resonant vibration has a particularly strong influence on a specific loop shape, it is possible to suppress an incidence rate of failure of the wire connection strength.

As a loop shape which is made to be different between part of the lead pins and the other lead pins, there is the direction of the loop of the wire with respect to a length direction of the lead pin, the length of the loop of the wire, or the height of the loop of the wire. By making at least one of these different, it is possible to make the vibration mode different between part of the lead pins and the other lead pins. As a result, it is possible to reduce the influence of the vibration occurring during the wire bonding on the other lead pin. Therefore, the resonance of the other lead pin due to the vibration occurring during the wire bonding is reduced, and therefore, it is possible to suppress a decrease in the connection strength of the wire bonded and connected to the lead pin.

Figure 2:
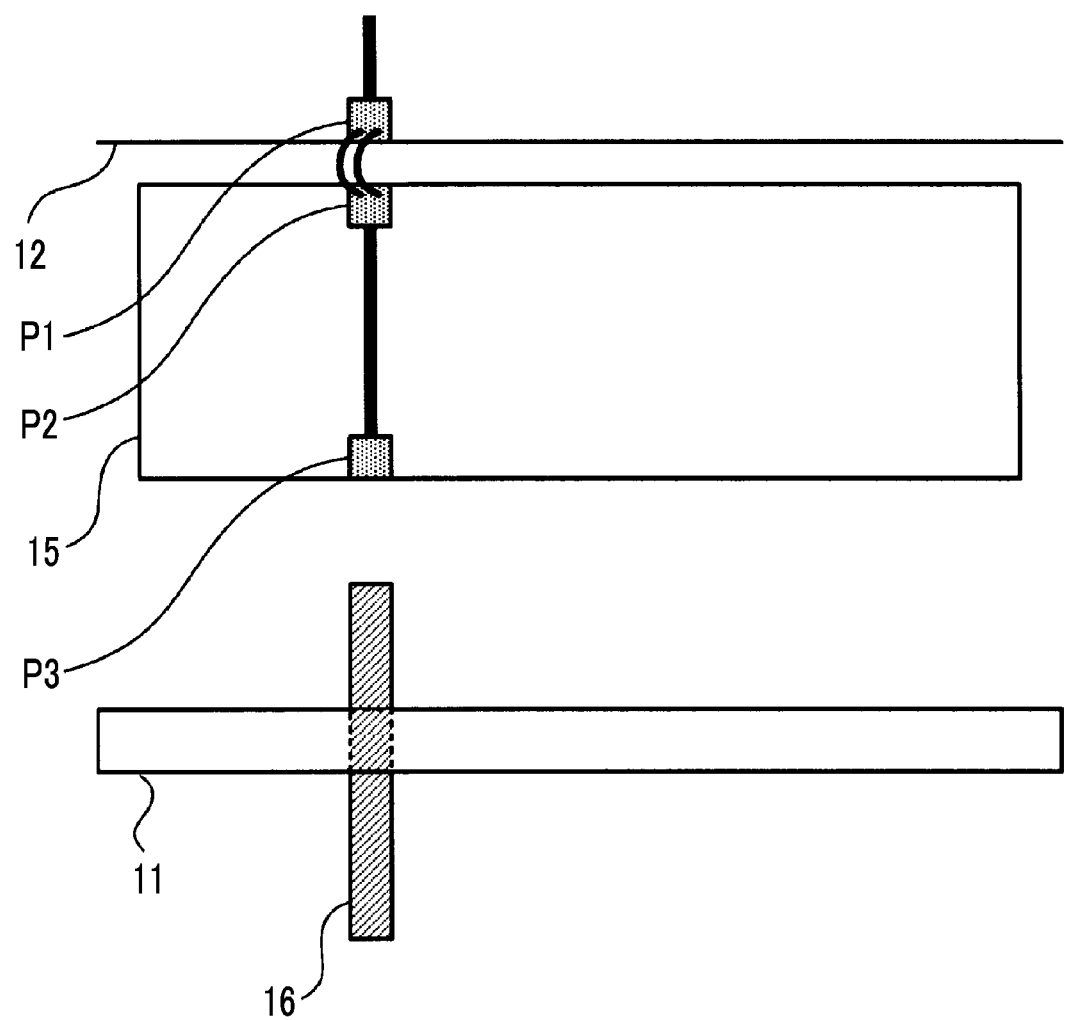
FIG. 2 is a diagram showing an example in which wire bonding is performed linearly along a length direction of a lead pin.
Figure 3:
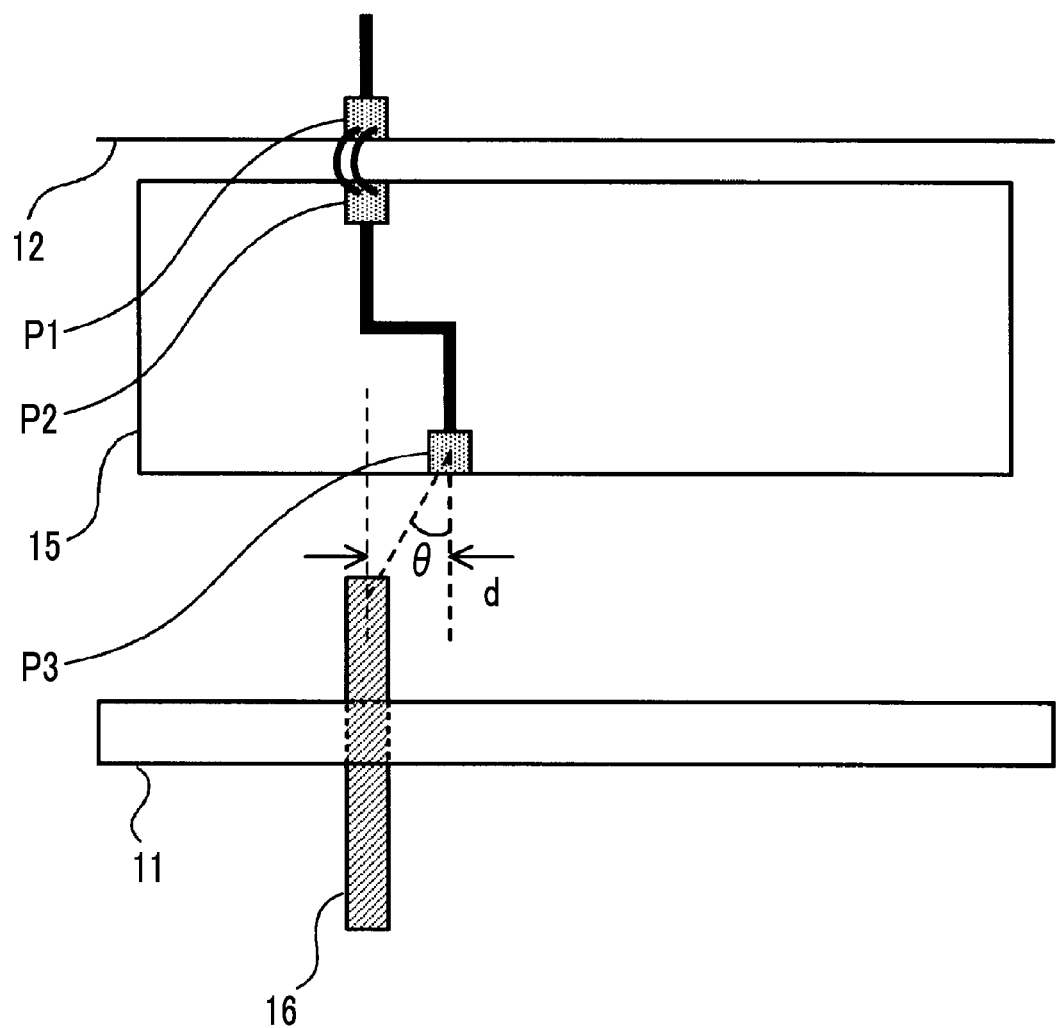
FIG. 3 is a diagram showing an example in which wire bonding is performed in an oblique direction with respect to a length direction of a lead pin.

The direction of the loop of the wire with respect to the length direction of the lead pin can be changed, for example, by performing the wire bonding in an oblique direction with respect to the length direction of the lead pin. That is, the wire bonding with respect to the lead pin 16 is not performed linearly along the length direction of the lead pin, as shown in FIG. 2, and is performed to be inclined in an obliquely lateral direction with respect to the length direction of the lead pin, as shown in FIG. 3. In order to perform the wire bonding in the obliquely lateral direction with respect to the length direction of the lead pin, it is favorable if an electrode pad P3 of the relay substrate 15, which is bonded and connected to the lead pin 16, is disposed to be shifted with respect to the length direction of the lead pin. In the example of FIG. 3, the electrode pad P3 is disposed at a position shifted by a distance d with respect to the length direction of the lead pin, whereby a configuration is made such that wire bonding in an oblique direction that forms an angle θ with respect to the length direction of the lead pin is made. In this manner, by performing the wire bonding in which an angle with respect to the length direction of the lead pin is different between part of the lead pins and the other lead pins, it is possible to make the vibration modes of these lead pins different from each other, and thus it is possible to reduce the influence of the vibration occurring during the wire bonding on the other lead pin.

FIG. 5 shows a state where the lengths of the loops of the wires in the wire bonding are made to be different from each other. In the example of FIG. 5, the lengths of the wire 17a bonded and connected to the lead pin 16a and the wire 17b bonded and connected to the other lead pin 16b are different from each other. Further, when the length of the protrusion portion of each lead pin, which protrudes into the housing, is L, the loop shapes of the respective wires in a case where vibration having a wavelength λ=4L is generated are shown by a solid line and a broken line. The solid line shows the loop shape when the tip portion of the lead pin has moved upward, the broken line shows the loop shape when the tip portion of the lead pin has moved downward, and it can be seen that the vibration modes become different from each other. In this manner, by performing wire bonding in which the length of the loop of the wire is different between part of the lead pins and the other lead pins, it is possible to make the vibration modes of these lead pins different from each other, and thus it is possible to reduce the influence of the vibration occurring during the wire bonding on the other lead pin.

FIG. 6 shows a state where the heights of the loops of the wires in the wire bonding are made to be different from each other. In the example of FIG. 6, the height of the wire 17a bonded and connected to the lead pin 16a and the wire 17b bonded and connected to the other lead pin 16b are different from each other. In this manner, by performing wire bonding in which the height of the loop of the wire is different between part of the lead pins and the other lead pins, it is possible to make the vibration modes of these lead pins different from each other, and thus it is possible to reduce the influence of the vibration occurring during the wire bonding on the other lead pin.

Figure 4:
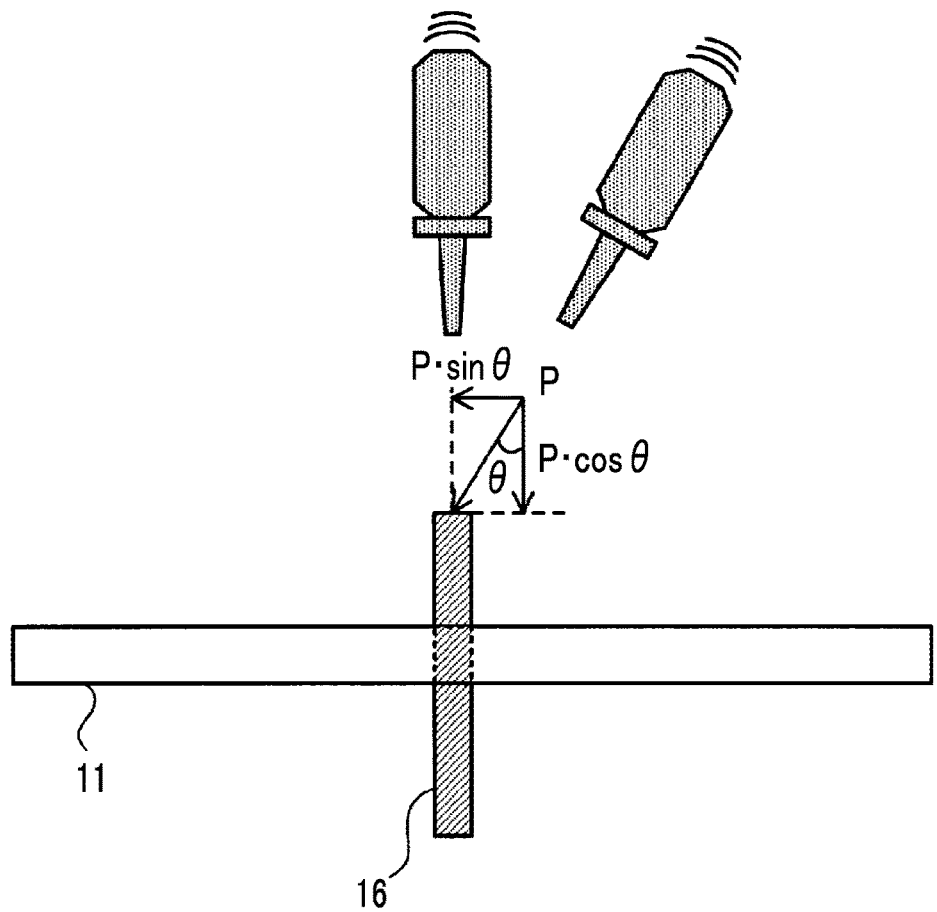
FIG. 4 is a diagram for describing dispersion of vibration energy by wire bonding in an oblique direction.

Further, by performing the wire bonding in the oblique direction with respect to the length direction of the lead pin, it is possible to disperse the vibration energy at the time of the wire bonding, and thus it is possible to achieve wire bonding with higher connection reliability. The mechanism will be described with reference to FIG. 4. Here, the vibration energy which is generated in a bonding direction at the time of the wire bonding is set to be P. In linear wire bonding (FIG. 2) in which the bonding direction and the length direction of the lead pin coincide with each other, vibration having the vibration energy P in the length direction is applied to the lead pin 16. On the other hand, in wire bonding in an oblique direction (FIG. 3) in which there is a deviation by the angle θ between the bonding direction and the length direction of the lead pin, vibrations dispersed to vibration energy P·cos θ in the length direction and vibration energy P·sin θ in the width direction are applied to the lead pin 16. In this manner, it can be seen that it is effective to suppress the resonance of the other lead pin merely by performing the wire bonding in the oblique direction with respect to the length direction of the lead pin even in wire bonding at the same angle as the other lead pin. Further, it is possible to more effectively realize wire bonding with higher connection reliability by combining the above-described wire bonding in which the loop shapes are different from each other with the wire bonding in the oblique direction with respect to the length direction of the lead pin.

Hereinafter, the optical modulator according to the present invention will be described with examples.

First Example

Figure 7:
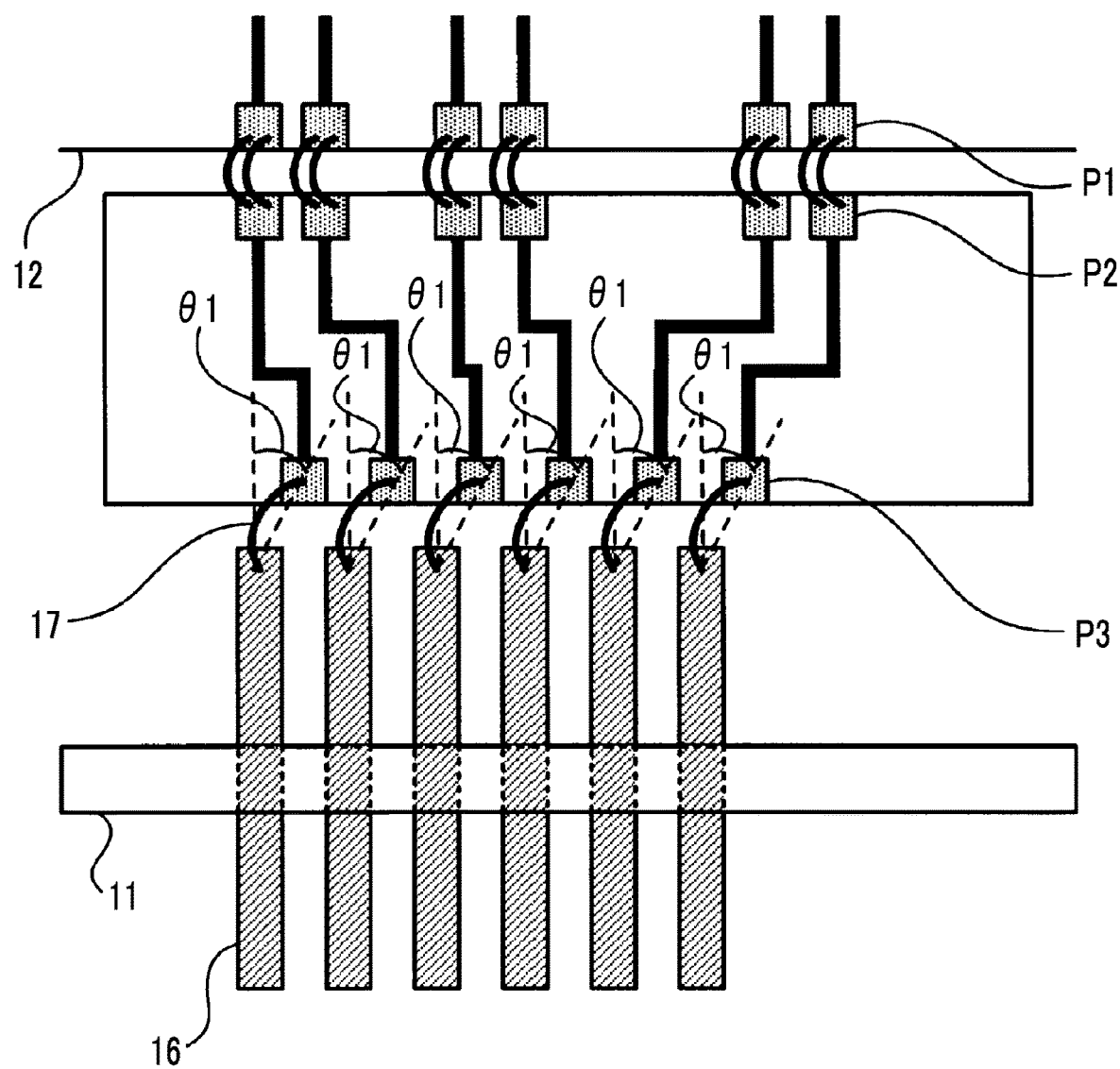
FIG. 7 is a diagram showing a wire bonding connection structure according to a first example of the present invention.

FIG. 7 is a diagram showing a wire bonding connection structure according to a first example.

In the first example, the lead pin 16 and the electrode pad P3 on the relay substrate 15 are bonded and connected to each other in the oblique direction at an angle (θ1) which is common to all combinations. In this manner, even if the respective lead pins have the same loop shape, by performing wire bonding in which the direction of the loop of the wire is oblique with respect to the length direction of the lead pin, it is possible to suppress a decrease in the connection strength of the wire bonded and connected to the lead pin.

Second Example

Figure 8:
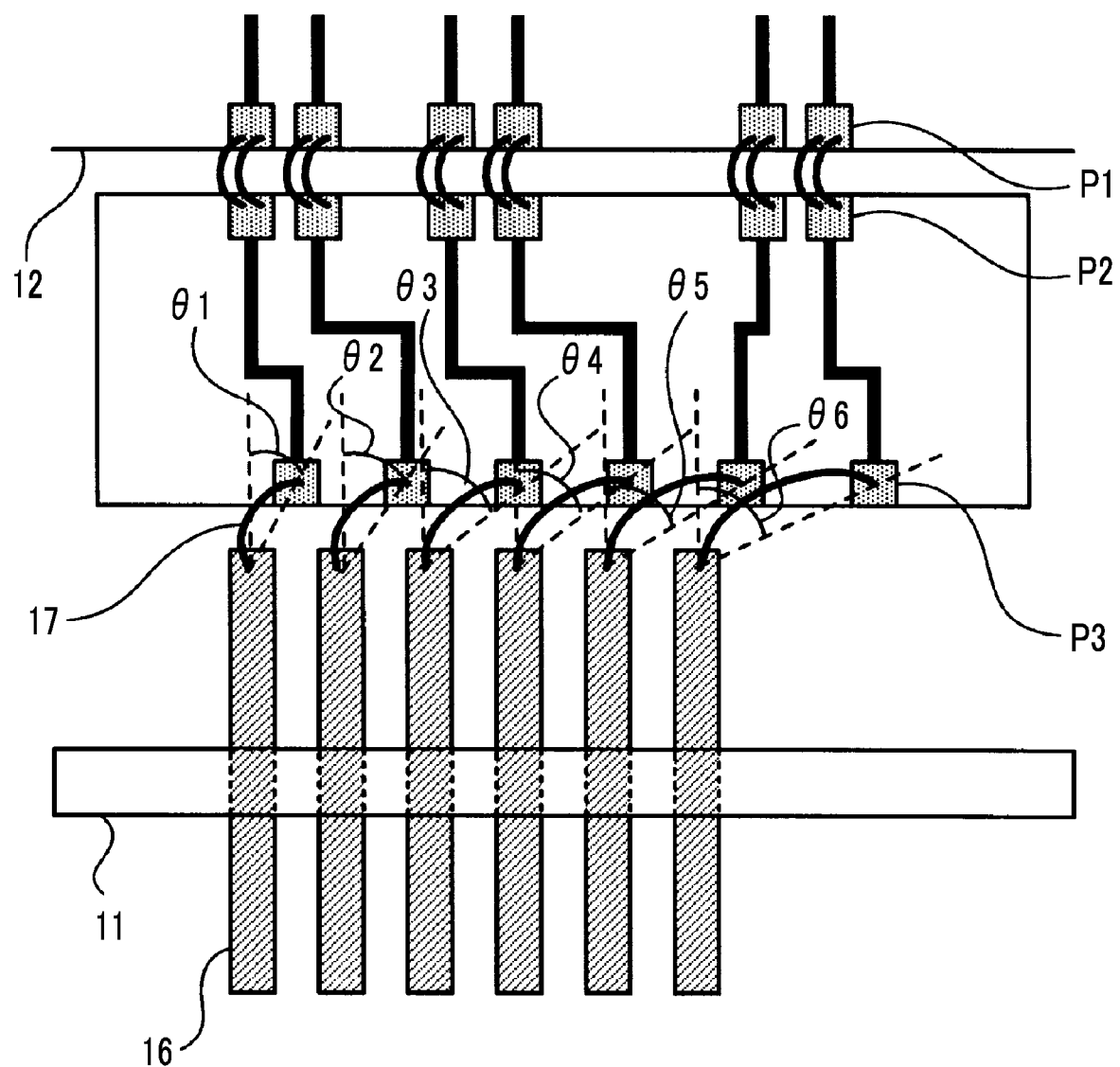
FIG. 8 is a diagram showing a wire bonding connection structure according to a second example of the present invention.

FIG. 8 is a diagram showing a wire bonding connection structure according to a second example.

In the second example, the lead pin 16 and the electrode pad P3 on the relay substrate 15 are bonded and connected to each other at different angles (θ1 to θ6) in all combinations. In this manner, by performing wire bonding in which the direction of the loop of the wire with respect to the length direction of the lead pin is different between part of the lead pins and the other lead pins, it is possible to further enhance the effect of suppressing a decrease in the connection strength of the wire bonded and connected to the lead pin than in the first example.

Third Example

Figure 9:
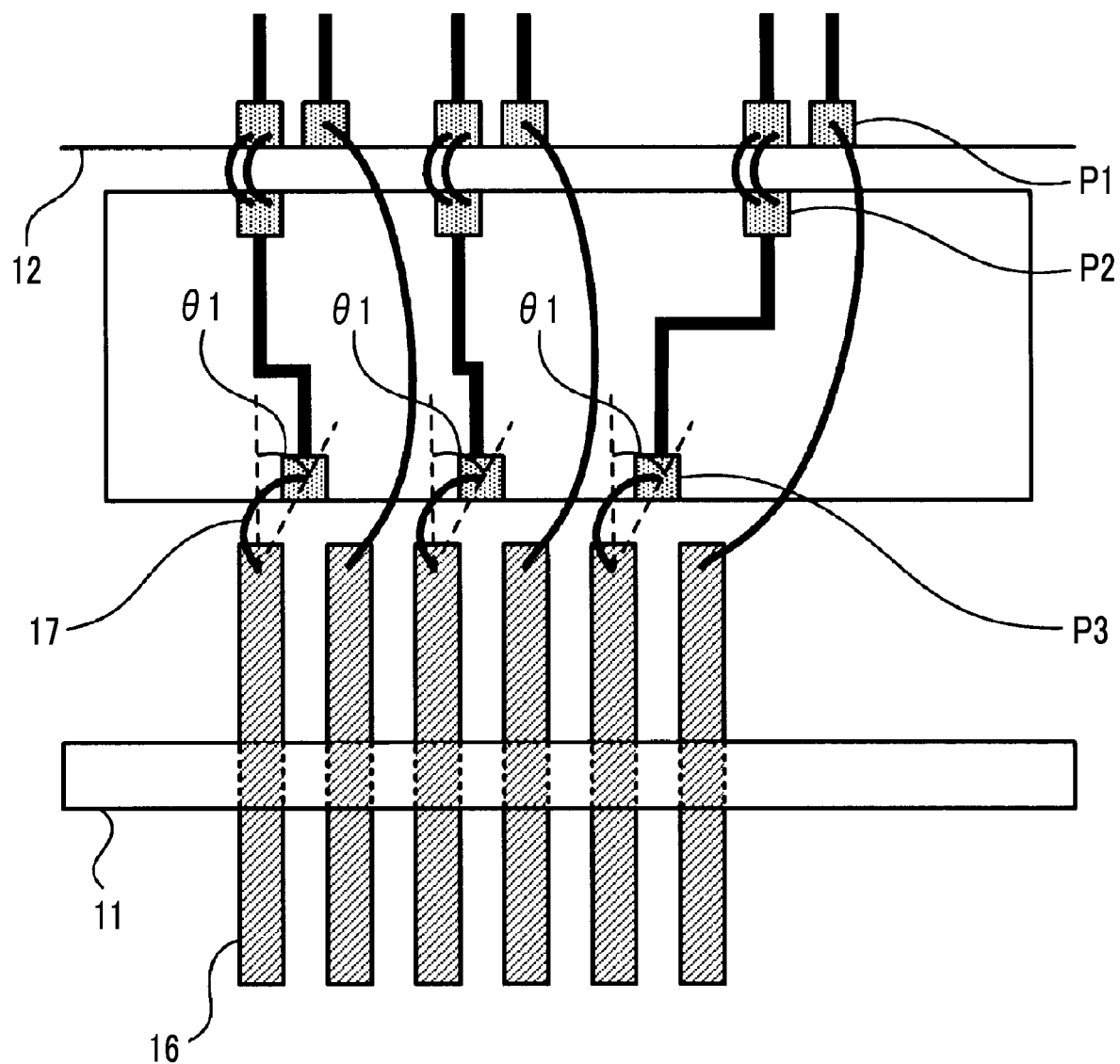
FIG. 9 is a diagram showing a wire bonding connection structure according to a third example of the present invention.

FIG. 9 is a diagram showing a wire bonding connection structure according to a third example.

In the third example, the bonding connection between the lead pin 16 and the electrode pad P3 on the relay substrate 15 and the bonding connection between the lead pin 16 and an electrode pad P1 on the optical modulation element 12 are performed alternately. That is, the length of the loop of the wire is made to be different between part of the lead pins and the other lead pins. Further, the bonding connection between the lead pin 16 and the electrode pad P3 on the relay substrate 15 is performed at an angle (θ1) which is common to all combinations. On the other hand, the bonding connection between the lead pin 16 and the electrode pad P1 on the optical modulation element 12 is performed at an angle different from the common angle (θ1). In this manner, by making the direction of the loop of the wire with respect to the length direction of the lead pin and the length of the loop of the wire different between part of the lead pins and the other lead pins, it is possible to suppress a decrease in the connection strength of the wire bonded and connected to the lead pin.

Fourth Example

Figure 10:
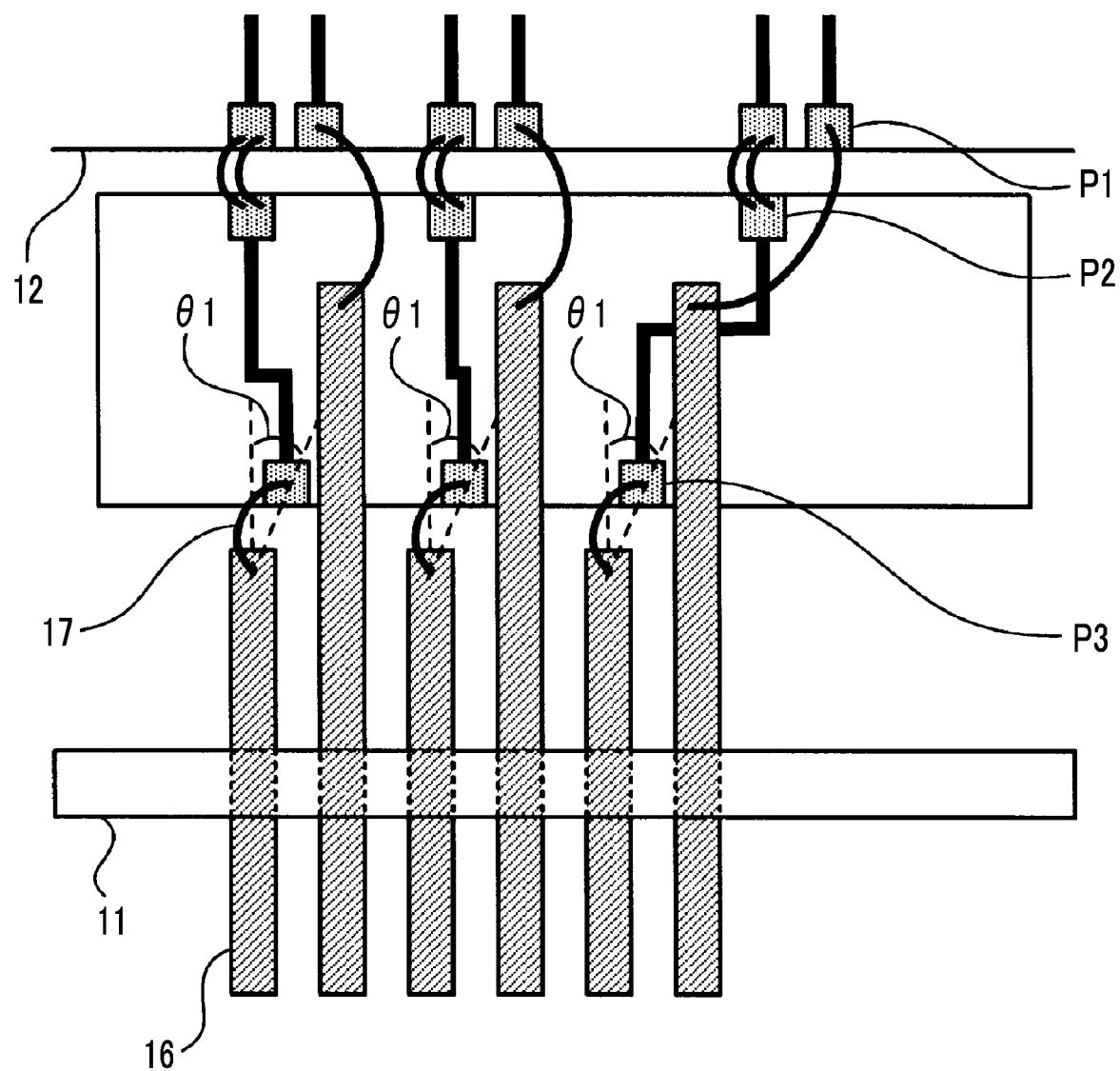
FIG. 10 is a diagram showing a wire bonding connection structure according to a fourth example of the present invention.

FIG. 10 is a diagram showing a wire bonding connection structure according to a fourth example.

In the fourth example, the bonding connection between the lead pin 16 and the electrode pad P3 on the relay substrate 15 and the bonding connection between the lead pin 16 and the electrode pad P1 on the optical modulation element 12 are performed alternately. Further, the bonding connection between the lead pin 16 and the electrode pad P3 on the relay substrate 15 is performed at an angle (θ1) which is common to all combinations. On the other hand, the bonding connection between the lead pin 16 and the electrode pad P1 on the optical modulation element 12 is performed at an angle different from the common angle (θ1). Further, the lead pin 16 which is bonded and connected to the electrode pad P1 on the optical modulation element 12 is made such that the length of the protrusion portion protruding into the internal space is longer than in the lead pin 16 which is bonded and connected to the electrode pad P3 on the relay substrate 15. That is, the natural frequency of each lead pin is made to be different from the natural frequency of the lead pin adjacent thereto. In this way, it is possible to make it more difficult for the resonance of the lead pin during the wire bonding to occur, and thus the effect of suppressing a decrease in the connection strength of the wire bonded and connected to the lead pin can be enhanced.

Fifth Example

Figure 11:
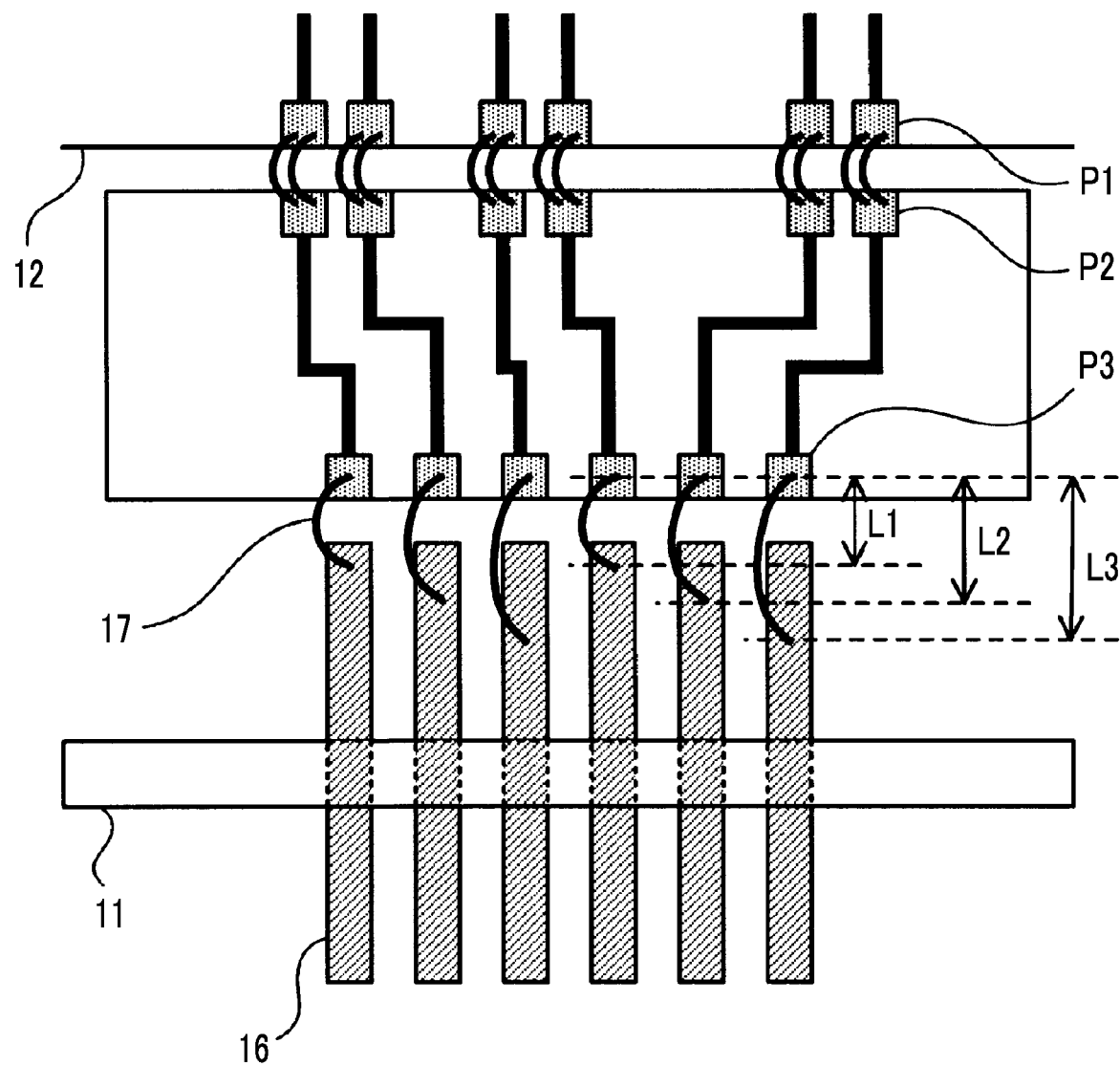
FIG. 11 is a diagram showing a wire bonding connection structure according to a fifth example of the present invention.

FIG. 11 is a diagram showing a wire bonding connection structure according to a fifth example.

In the fifth example, the lead pin 16 and the electrode pad P3 on the relay substrate 15 are bonded and connected to each other at different lengths (L1 to L3) in combinations adjacent to each other. Specifically, the bonding positions on the relay substrate side are made to be common, and the bonding position on the lead pin side is shifted with respect to an arrangement direction of the lead pins, thereby realizing bonding connection at different lengths. In this manner, by making the length of the loop of the wire different between part of the lead pins and the other lead pins, it is possible to suppress a decrease in the connection strength of the wire bonded and connected to the lead pin.

Sixth Example

Figure 12:
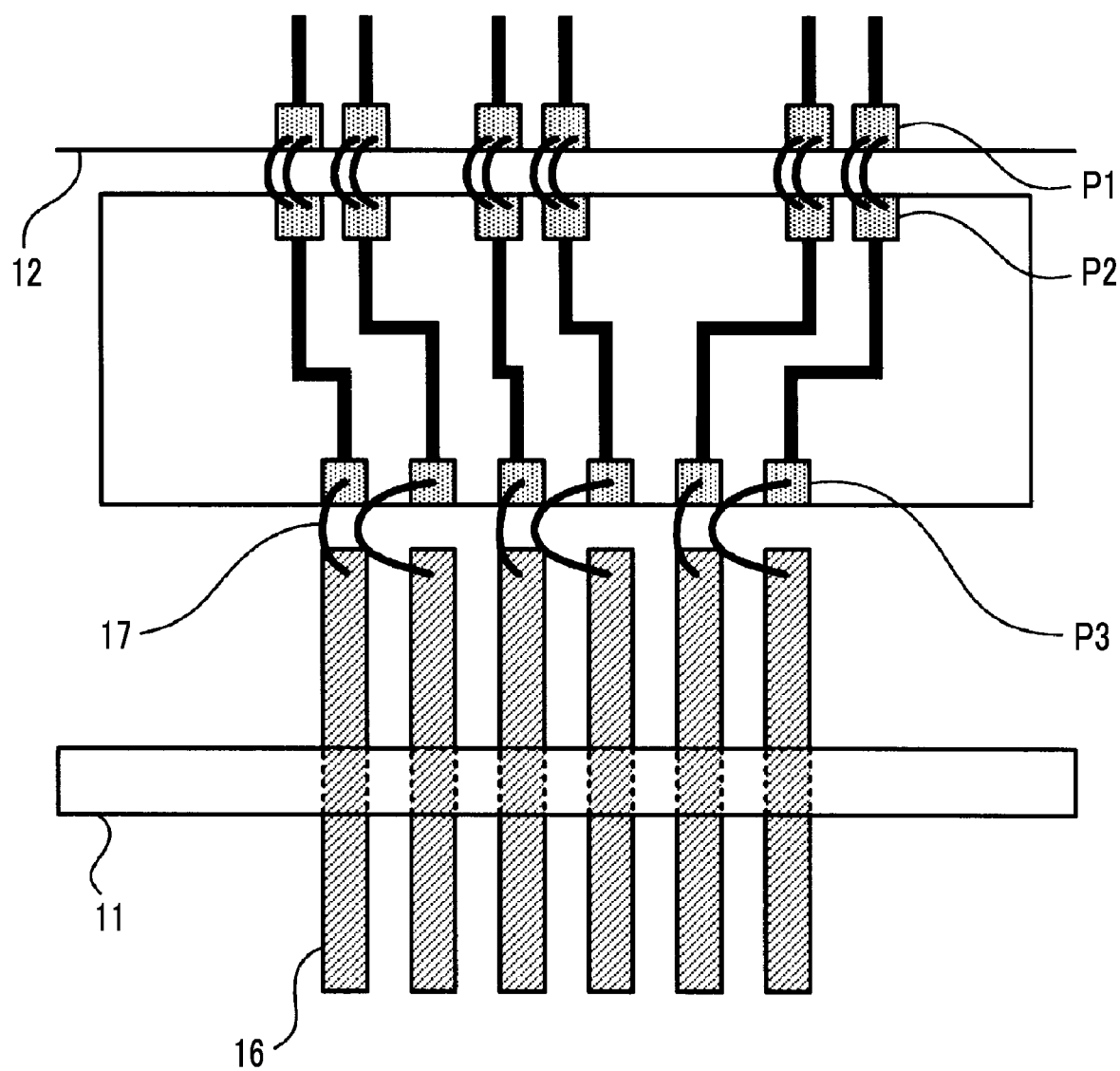
FIG. 12 is a diagram showing a wire bonding connection structure according to a sixth example of the present invention.

FIG. 12 is a diagram showing a wire bonding connection structure according to a sixth example.

In the sixth example, the lead pin 16 and the electrode pad P3 on the relay substrate 15 are bonded and connected to each other at different heights in combinations adjacent to each other. In this manner, by making the height of the loop of the wire different between part of the lead pins and the other lead pins, it is possible to suppress a decrease in the connection strength of the wire bonded and connected to the lead pin.

Seventh Example

Figure 13:
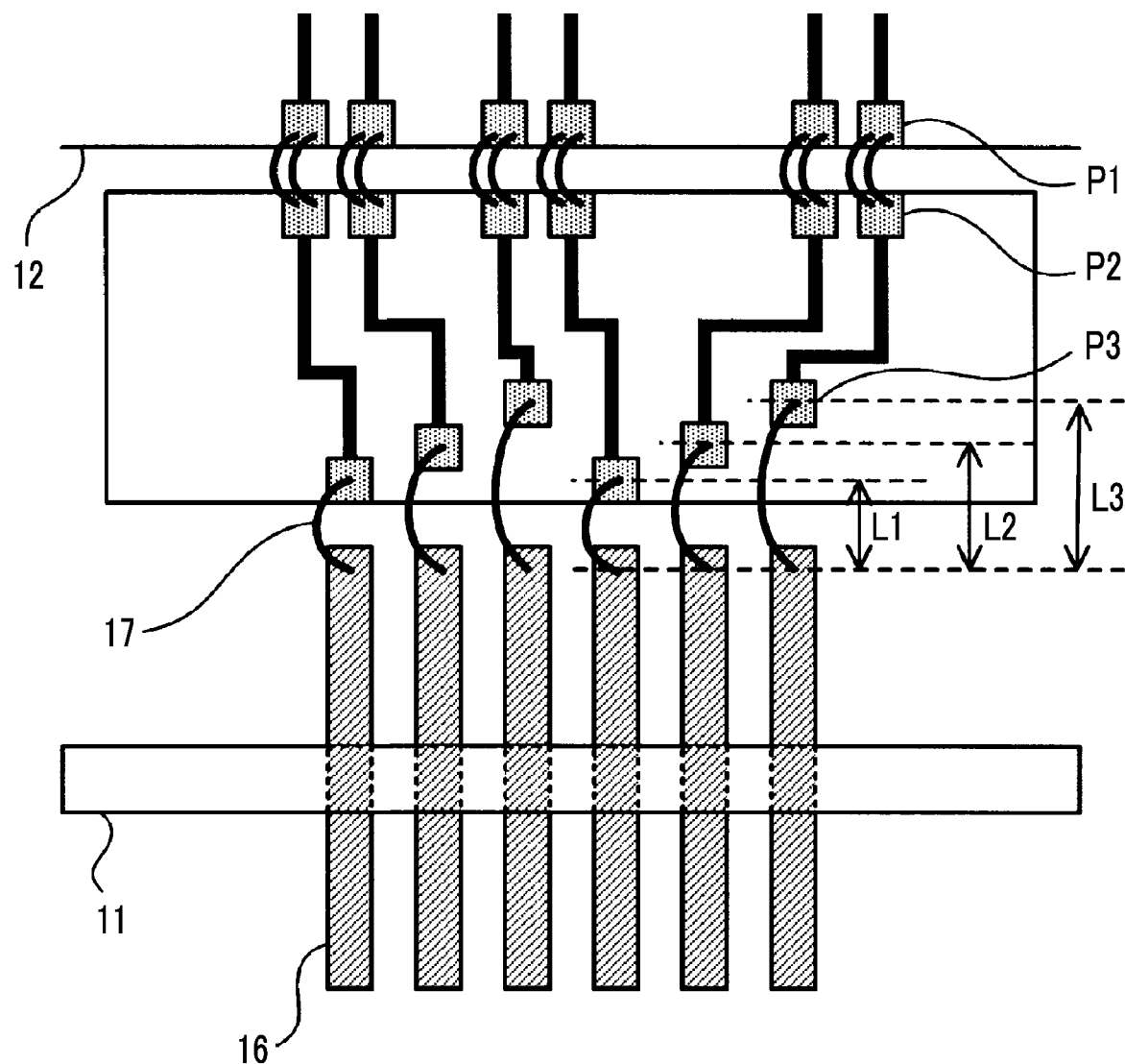
FIG. 13 is a diagram showing a wire bonding connection structure according to a seventh example of the present invention.

FIG. 13 is a diagram showing a wire bonding connection structure according to a seventh example.

In the seventh example, the lead pin 16 and the electrode pad P3 on the relay substrate 15 are bonded and connected to each other at different lengths (L1 to L3) in combinations adjacent to each other. Specifically, the bonding positions on the lead pin side are made to be common, and the electrode pad P3 on the relay substrate 15 is disposed to be shifted with respect to an arrangement direction of the lead pins, thereby making the distance between the lead pin and the electrode pad different. In this manner, by making the length of the loop of the wire different between part of the lead pins and the other lead pins, it is possible to suppress a decrease in the connection strength of the wire bonded and connected to the lead pin.

In a configuration in which the lead pin 16 and the electrode pad P1 on the optical modulation element 12 are bonded and connected to each other, bonding connection in which the lengths of the loops of the wires are different from each other may be realized by disposing the electrode pad P1 on the optical modulation element 12 so as to be shifted with respect to the arrangement direction of the lead pins.

Eighth Example

Figure 14:
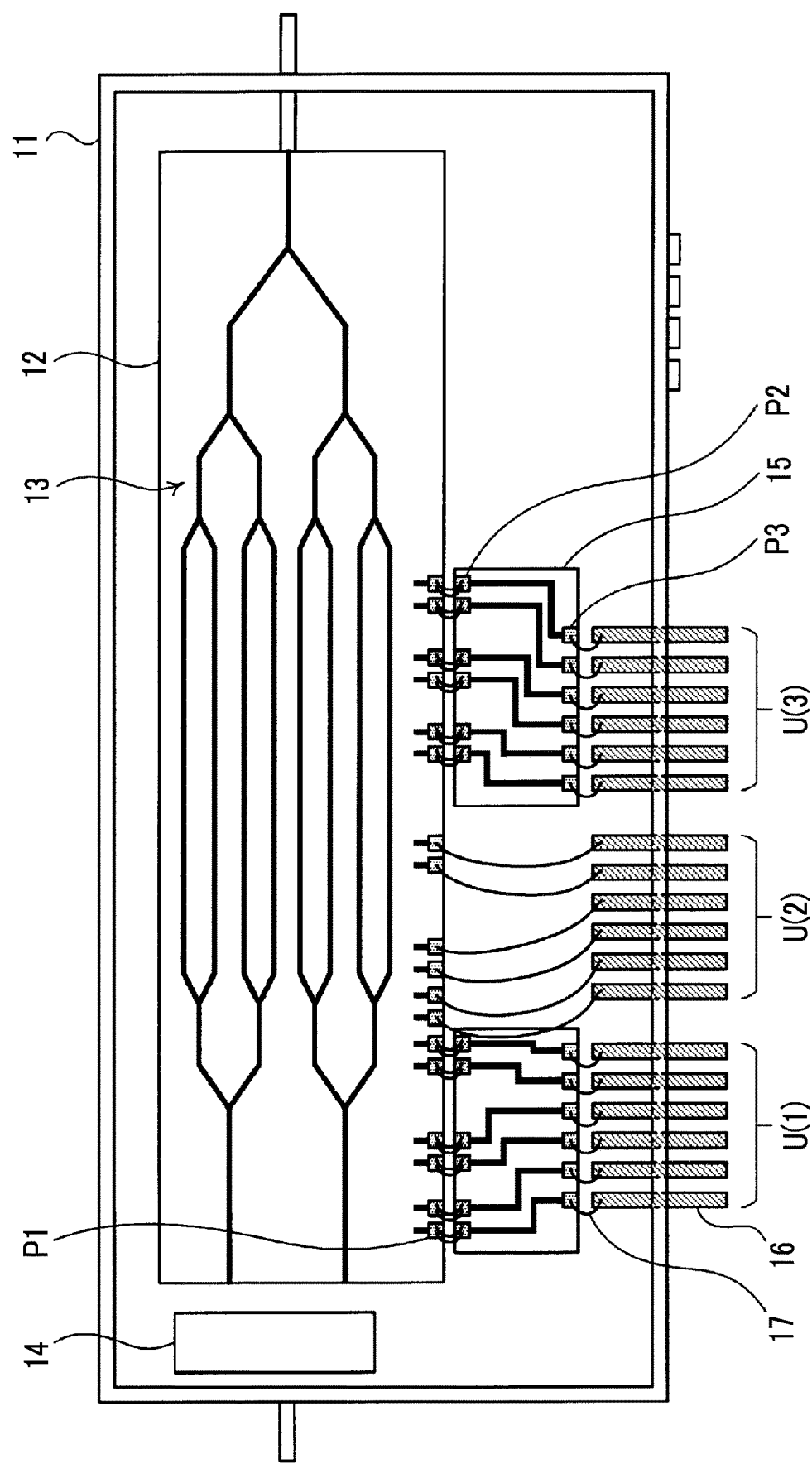
FIG. 14 is a diagram showing a wire bonding connection structure according to an eighth example of the present invention.

FIG. 14 is a diagram showing a wire bonding connection structure according to an eighth example.

In the eighth example, three units U(1) to U(3), each of which includes six lead pins 16, are formed and fixed side by side to the side surface of the housing 11. Further, in the unit U(1) on the left side and the unit U(3) on the right side, the lead pin 16 and the electrode pad P3 on the relay substrate 15 are bonded and connected to each other, and in the central unit U(2), the lead pin 16 and the electrode pad P1 on the optical modulation element 12 are bonded and connected to each other. That is, the bonding connection with the relay substrate or the bonding connection with the optical modulation element is changed on a unit basis, so that bonding connection at different lengths is realized. In this manner, by making the length of the loop of the wire different between part of the lead pins and the other lead pins, it is possible to suppress a decrease in the connection strength of the wire bonded and connected to the lead pin.

Ninth Example

Figure 15:
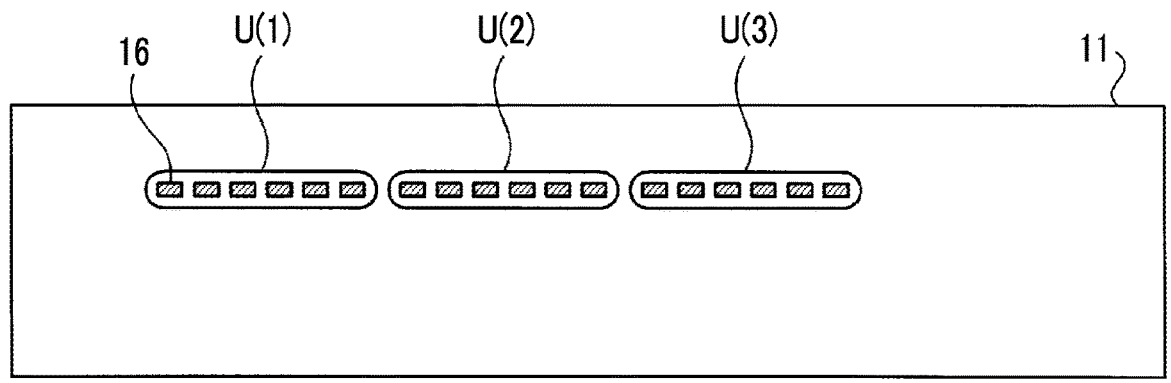
FIG. 15 is a diagram showing lead pin unit disposition according to an example of the related art.
Figure 16:
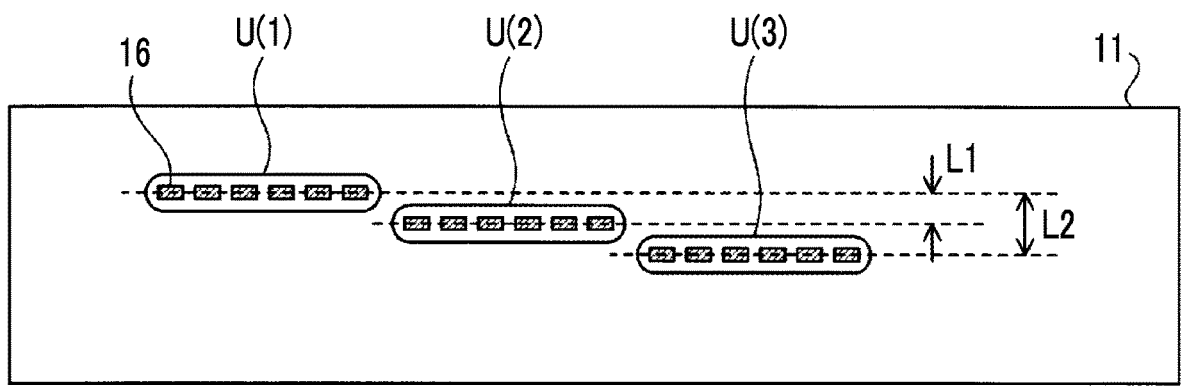
FIG. 16 is a diagram showing lead pin unit disposition according to a ninth example of the present invention.

FIG. 16 is a diagram showing lead pin unit disposition according to a ninth example. Further, FIG. 15 shows lead pin unit disposition according to an example of the related art as a comparative example of the ninth embodiment.

In the ninth example, three units U(1) to U(3), each of which includes six lead pins 16, are formed and fixed side by side to the side surface of the housing 11. Further, the respective units U(1) to U(3) are disposed at different height positions with respect to the height direction from the bottom surface of the housing 11. Specifically, the unit U(2) is disposed at a position lower than the unit U(1) by a distance L1, and the unit U(3) is disposed at a position lower than the unit U(1) by a distance L2 (>L1). Even with such a structure, it is possible to make the height of the loop of the wire different between part of the lead pins and the other lead pins, and thus it is possible to suppress a decrease in the connection strength of the wire bonded and connected to the lead pin.

Tenth Example

Figure 17:
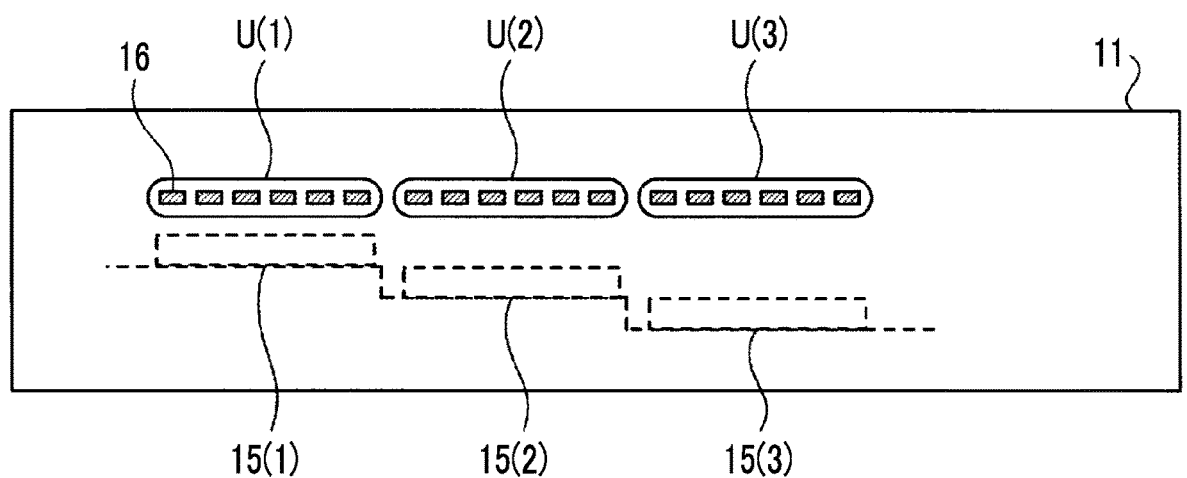
FIG. 17 is a diagram showing lead pin unit disposition and relay substrate disposition according to a tenth example of the present invention.
Figure 18:
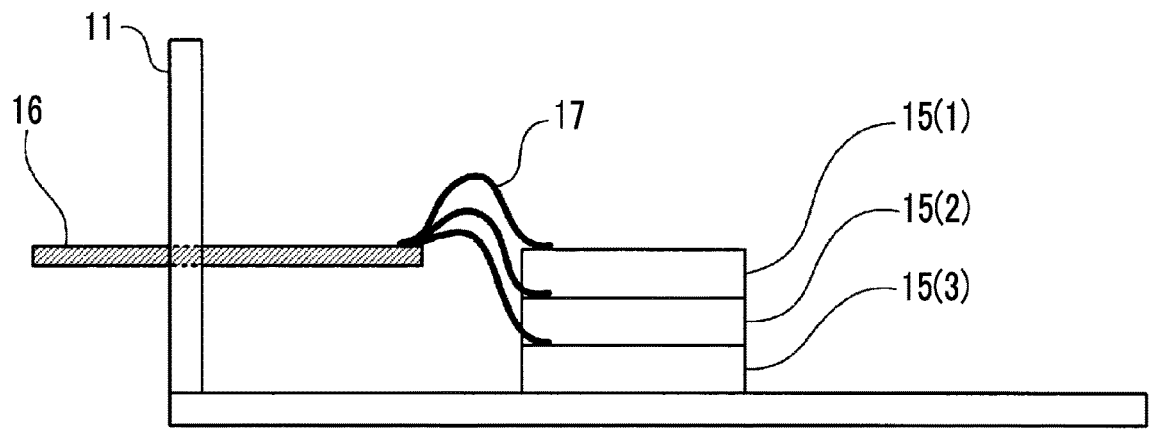
FIG. 18 is a diagram showing a wire bonding connection structure according to the tenth example of the present invention.

FIG. 17 is a diagram showing lead pin unit disposition and relay substrate disposition according to a tenth example. Further, FIG. 18 is a diagram showing a wire bonding connection structure according to the tenth example.

In the tenth example, three units U(1) to U(3), each of which includes six lead pins 16, are formed and fixed side by side to the side surface of the housing 11. Further, relay substrates 15(1) to 15(3) individually provided with respect to the units U(1) to U(3) are disposed at different height positions with respect to the height direction from the bottom surface of the housing 11. Even with such a structure, it is possible to make the height of the loop of the wire different between part of the lead pins and the other lead pins, and thus it is possible to suppress a decrease in the connection strength of the wire bonded and connected to the lead pin.

Eleventh Example

Figure 19:
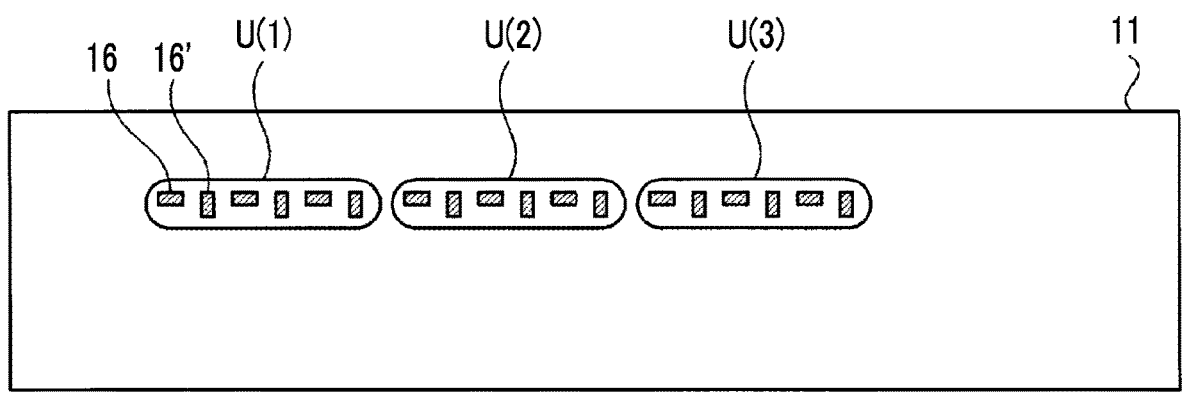
FIG. 19 is a diagram showing lead pin unit disposition according to an eleventh example of the present invention.
Figure 20:
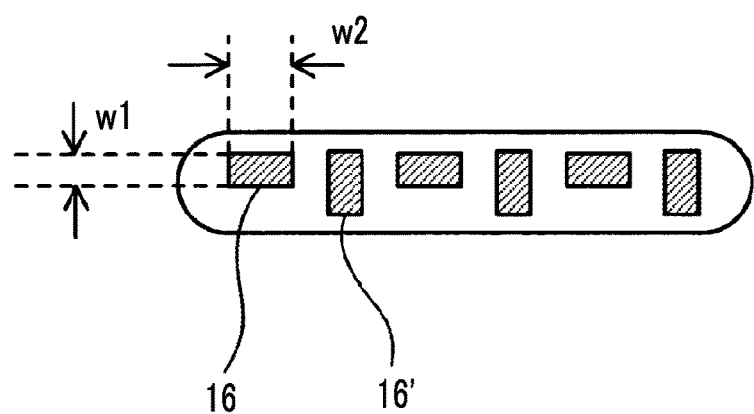
FIG. 20 is a diagram showing a lead pin unit structure according to the eleventh example of the present invention.

FIG. 19 is a diagram showing lead pin unit disposition according to an eleventh example. Further, FIG. 20 is a diagram showing a lead pin unit structure according to the eleventh example.

In the eleventh example, three units U(1) to U(3), each of which includes six lead pins 16, are formed and fixed side by side to the side surface of the housing 11. Each of the units U(1) to U(3) has a structure in which the lead pins 16 in a normal posture with the bonding surface horizontally disposed and lead pins 16' in a special posture with the bonding surface vertically disposed are alternately arranged. In this manner, by making the direction of the bonding surface different between part of the lead pins and the other lead pins, it is possible to make the height of the loop of the wire different, and thus it is possible to suppress a decrease in the connection strength of the wire bonded and connected to the lead pin. A configuration for making the direction of the bonding surface different between part of the lead pins and the other lead pins is not limited to the above configuration. For example, a configuration may be made in which the lead pin rotated clockwise by a predetermined angle (for example, 45 degrees) and the lead pin rotated counterclockwise by the predetermined angle are mixed. Further, a configuration may be made in which three or more types of lead pins having different bonding surface directions are mixed.

Figure 21:
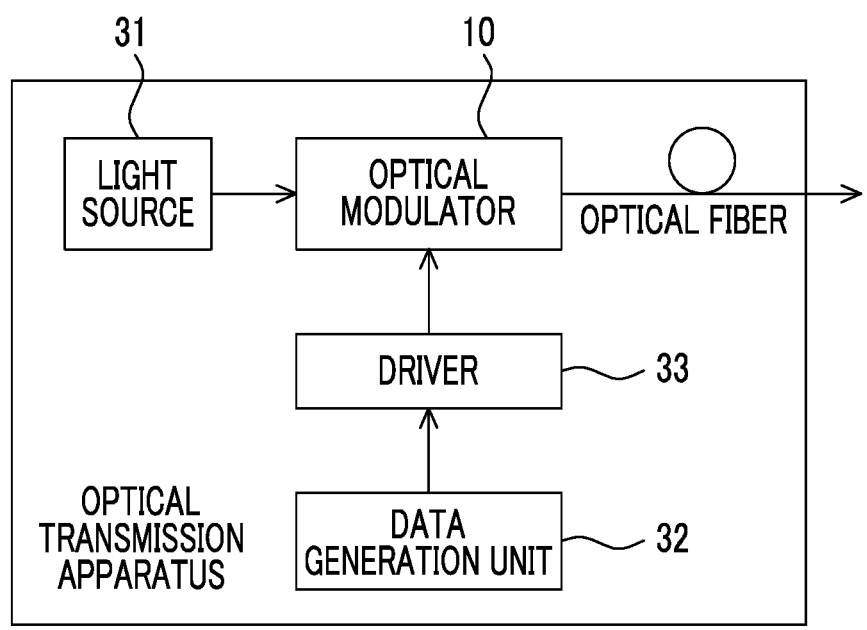
FIG. 21 is a block diagram showing a configuration example of an optical transmission apparatus equipped with an optical modulator according to the present invention.

FIG. 21 is a block diagram showing a configuration example of an optical transmission apparatus equipped with the optical modulator according to the present invention. The optical transmission apparatus includes a light source 31, a data generation unit 32, a driver 33, and the like, in addition to an optical modulator 10. As the optical modulator 10, the optical modulator having the structure described in each of the examples described above is used.

The data generation unit 32 generates signal data to be transmitted by the optical transmission apparatus and inputs the signal data to the driver 33. The driver 33 amplifies the input signal data and generates a high-frequency signal having a waveform corresponding to the signal data. The high-frequency signal generated by the driver 33 is inputted to the RF input part of the optical modulator 10 via an external circuit substrate.

The optical modulator 10 includes, in addition to the RF input part, a large number of lead pins as a signal input part for DC bias control of a plurality of optical modulator units formed on the optical modulation element, or an output part of the light-receiving element (monitor PD) generating an electrical signal which is used for the DC bias control. As a DP-QPSK modulator in which, for example, four RF input parts, four optical modulator parts, and two monitor PDs for feedback control are integrated, there is a DP-QPSK modulator provided with 18 lead pins including a ground pin or an NC pin. Each of the lead pins is fixed and connected to a bias control circuit or the like installed in the optical transmission apparatus by using solder or the like, and a DC bias voltage or a low-frequency electrical signal is applied thereto. Each lead pin is set such that the transmission characteristics of the optical transmission apparatus can be favorably and stably utilized. The light wave modulated by the optical modulator 10 is sent out from the optical transmission apparatus as an optical output through an optical fiber connected to the output side of the optical modulator 10.

As described above, according to the present invention, even in a case of using an optical modulator having a lead pin configuration in which hermetic sealing is possible at a relatively low cost, it is possible to provide a compact and highly reliable optical modulator. Further, by installing the optical modulator according to the present invention in the optical transmission apparatus, it is possible to provide a highly reliable optical transmission apparatus.

Here, in each of the examples described above, LN is used for a substrate of the optical modulation element. However, other material substrates may be used. Further, in each of the examples described above, a case where the number of high-frequency signal electrodes is four has been described as an example. However, there is no limitation to this number.

Further, although specific illustration and description are omitted, it goes without saying that a configuration is also acceptable in which some of the configurations described in the respective examples are combined.

The present invention can be applied to an optical modulator provided with a large number of lead pins fixed to a side wall of a housing and each having a protrusion portion protruding into an internal space of the housing.

What is claimed is:

1. An optical modulator, comprising:
an optical modulation element;
a housing, in which the optical modulation element is accommodated; and
a plurality of lead pins, being fixed to a side wall of the housing,
wherein each of the plurality of lead pins has a protrusion portion protruding into an internal space of the housing, and each of the plurality of lead pins is electrically connected to the optical modulation element or a relay substrate electrically connected to the optical modulation element by wire bonding to the protrusion portion, and
a loop shape of a wire which is bonded and connected to each of at least part of the lead pins among the plurality of lead pins is different from a loop shape of a wire which is bonded and connected to other lead pins in at least one of a direction of a loop of the wire with respect to a length direction of the lead pin, a length of the loop of the wire, or a height of the loop of the wire.

2. The optical modulator according to claim 1, wherein the plurality of lead pins including:
a lead pin bonded and connected to an electrode pad of the optical modulation element, and
a lead pin bonded and connected to an electrode pad of the relay substrate.

3. The optical modulator according to claim 1, wherein electrode pads which are bonded and connected to the optical modulation element or the relay substrate are disposed, such that a distance between the electrode pad and the lead pin with respect to an arrangement direction of the lead pin is different between at least part of the lead pins and the other lead pins.

4. The optical modulator according to claim 1, wherein electrode pads which are bonded and connected to the optical modulation element or the relay substrate are disposed at different height positions with respect to a height direction from a bottom surface of the housing between at least part of the lead pins and the other lead pins.

5. The optical modulator according to claim 1, wherein a height of the lead pin from a bottom surface of the housing is a height different between at least part of the lead pins and the other lead pins.

6. The optical modulator according to claim 1, wherein at least part of the lead pins among the plurality of lead pins are fixed to the side wall of the housing with bonding surface directions different from those of the other lead pins.

7. An optical transmission apparatus, comprising: the optical modulator according to claim 1.

8. The optical modulator according to claim 7, wherein the plurality of lead pins including: a lead pin bonded and connected to an electrode pad of the optical modulation element, and a lead pin bonded and connected to an electrode pad of the relay substrate.

9. The optical transmission apparatus according to claim 7, wherein
electrode pads which are bonded and connected to the optical modulation element or the relay substrate are disposed, such that a distance between the electrode pad and the lead pin with respect to an arrangement direction of the lead pin is different between at least part of the lead pins and the other lead pins.

10. The optical transmission apparatus according to claim 7, wherein
electrode pads which are bonded and connected to the optical modulation element or the relay substrate are disposed at different height positions with respect to a height direction from a bottom surface of the housing between at least part of the lead pins and the other lead pins.

11. The optical transmission apparatus according to claim 7, wherein
a height of the lead pin from a bottom surface of the housing is a height different between at least part of the lead pins and the other lead pins.

12. The optical transmission apparatus according to claim 7, wherein
at least part of the lead pins among the plurality of lead pins are fixed to the side wall of the housing with bonding surface directions different from those of the other lead pins.

* * * * *